(12) United States Patent
Kanbe

(10) Patent No.: US 7,161,732 B2
(45) Date of Patent: Jan. 9, 2007

(54) ELECTROPHORETIC DISPLAY, METHOD FOR MAKING THE ELECTROPHORETIC DISPLAY, AND ELECTRONIC APPARATUS

(75) Inventor: Sadao Kanbe, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 11/321,774

(22) Filed: Dec. 29, 2005

(65) Prior Publication Data

US 2006/0126154 A1   Jun. 15, 2006

Related U.S. Application Data

(60) Division of application No. 10/619,090, filed on Jul. 14, 2003, now Pat. No. 7,038,832, which is a continuation-in-part of application No. 10/076,050, filed on Oct. 29, 2001, now abandoned.

(30) Foreign Application Priority Data

Oct. 27, 2000  (JP) ............................. 2000-329367
Oct. 24, 2001  (JP) ............................. 2001-326519

(51) Int. Cl.
G02B 26/00 (2006.01)
G09G 3/34 (2006.01)

(52) U.S. Cl. ...................... 359/296; 345/107
(58) Field of Classification Search ............... 345/107; 359/296

See application file for complete search history.

(56) References Cited

U.S. PATENT DOCUMENTS 5,961,804 A   10/1999  Jacobson et al. ........... 204/606
5,972,493 A   10/1999  Iwasaki et al.
6,067,185 A    5/2000  Albert et al. ............... 359/296
6,172,798 B1   1/2001  Albert et al. ............... 359/296
6,181,393 B1   1/2001  Enomoto et al. ............. 349/86
6,323,989 B1  11/2001  Jacobson et al. ........... 359/296
6,597,340 B1*  7/2003  Kawai ........................ 345/107
6,724,519 B1   4/2004  Comiskey et al. .......... 359/296

FOREIGN PATENT DOCUMENTS

WO       WO 00/54101 A1 *  9/2000

* cited by examiner

Primary Examiner—David N. Spector
(74) Attorney, Agent, or Firm—Harness, Dickey & Pierce, P.L.C.

(57) ABSTRACT

An electrophoretic display comprising a plurality of microcapsules disposed between a pair of substrates, wherein each microcapsule comprises a capsule body containing an insulating fluid and charged particles dispersed in the fluid. The microcapsules are contacted with at least the substrate arranged at a display face side of the pair of substrates and each microcapsule has a flat surface at least at the display face side so that the substrate at the display face side is in face-to-face contact with the microcapsules. As a result, the proportion of the contact area of the substrate with the microcapsules increases compared with the traditional electrophoretic display, preventing uneven displaying and achieving increased contrast and high-quality displaying.

5 Claims, 10 Drawing Sheets

31; TRANSPARENT ELECTRODES
32; CHARGED PARTICLE
33; COLORED FLUID
34; BINDER
35; SUBSTRATES

41; MICROCAPSULE
34; BINDER
32; CHARGED PARTICLE

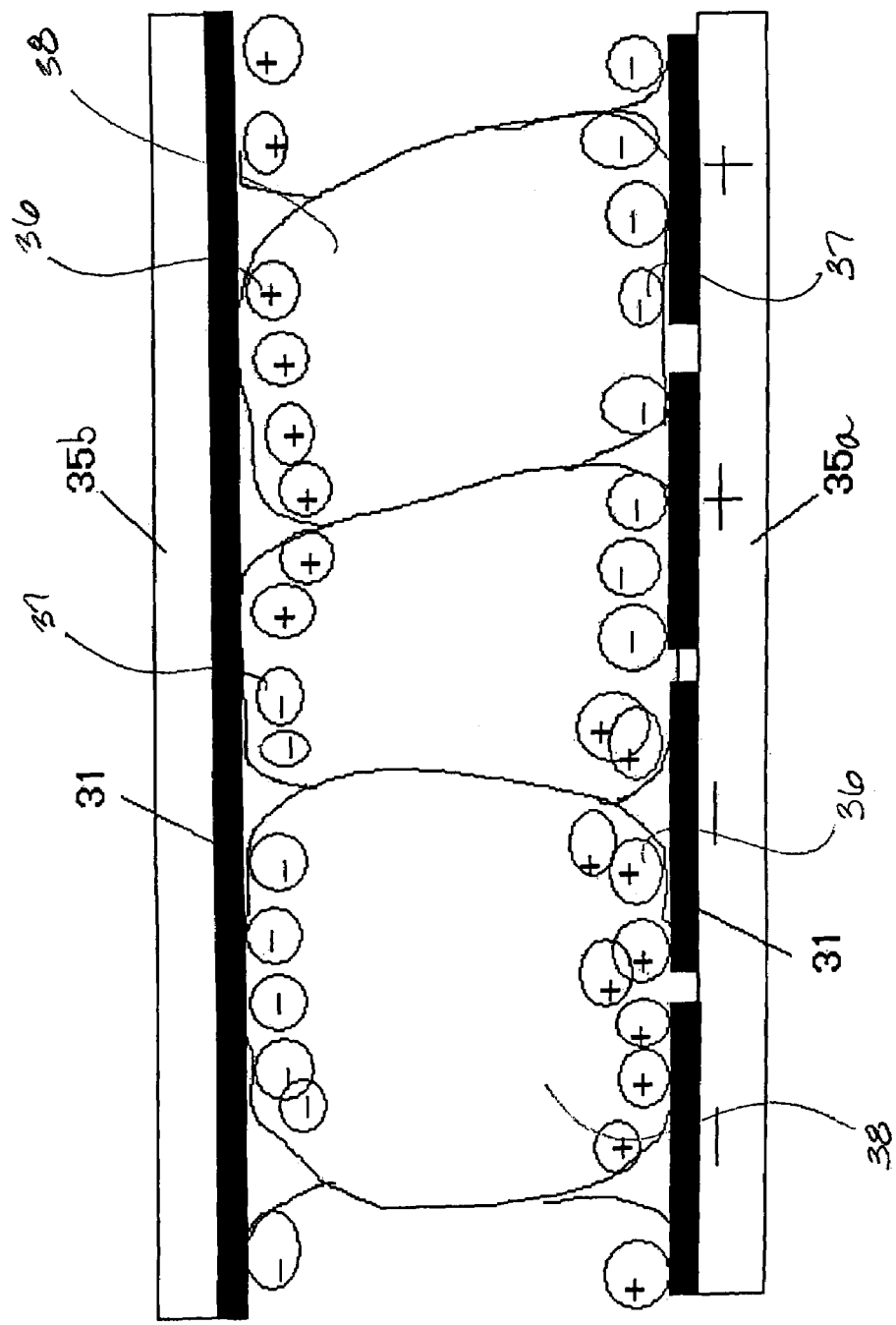

ELECTROPHORETIC DISPLAY, METHOD FOR MAKING THE ELECTROPHORETIC DISPLAY, AND ELECTRONIC APPARATUS

CROSS-REFERENCE TO RELATED APPLICATIONS

This application is a divisional application of U.S. patent application Ser. No. 10/619,090 filed Jul. 14, 2003, now U.S. Pat. No. 7,032,832 which is a continuation-in-part of U.S. patent application Ser. No. 10/076,050 filed on Oct. 29, 2001, abandoned, which claims priority to Japanese Patent Application 2001-326519, filed Oct. 24, 2001, and Japanese Patent Application 2000-329367, filed Oct. 27, 2000. The disclosures of the above applications are incorporated herein by reference in their entirety.

BACKGROUND OF THE INVENTION

The present invention relates to electrophoretic displays and electronic apparatuses provided with the electrophoretic displays.

In recent years, portable information apparatuses have rapidly developed. Thin displays of low-power consumption are increasingly required. A variety of developments are attempted to meet these requirements. Liquid crystal displays have satisfied such requirements.

The liquid crystal displays, however, still have unresolved problems, such as unsatisfactory visibility due to a viewing angle to the screen and reflected light and visual load due to a flickering light source. Thus, displays having reduced visual load have been intensively researched.

Reflective displays are promising in view of low-power consumption and reduced load to eyes. One of the displays is an electrophoretic display as disclosed in U.S. Pat. No. 3,612,758.

The principle of operation of the electrophoretic display is shown in FIG. 2. The electrophoretic display comprises charged particles 11, a dispersion of an insulating colored fluid 12 containing a dissolved dye, and a pair of substrates 15 and 15 opposing each other and holding the dispersion.

Each of the pair of substrates 15 and 15 is provided with a transparent electrode 14, and a voltage applied through the transparent electrode 14 moves the charged particles 11, which are charged electrophoretic particles, toward the electrode having the opposite polarity. Displaying is achieved by the contrast of the color of the charged particles 11 (electrophoretic particles) to the color of the colored fluid 12. The shape of the electrode can be appropriately changed to perform desired displaying.

For example, in a case of white charged particles 11 and a non-white colored fluid 12, the white charged particles 11 (electrophoretic particles) are attracted to an electrode at a viewer side under a voltage having a polarity, and the viewer sees a white display having a desired shape on the back of the color of the colored fluid 12. In contrast, the charged particles 11 (electrophoretic particles) are attracted toward the opposite electrode under a voltage having the opposite polarity and the viewer sees the color of the insulating colored fluid.

This electrophoretic display is made by a method which includes bonding the pair of substrates 15 and 15, each provided with the transparent electrode 14, separated by spacers 13 to form a cell, and loading the dispersion into the cell by a capillary phenomenon. Because sedimentation of the charged particles 11 occurs in this method, the life of the electrophoretic display is short.

A method for making an electrophoretic display is proposed in which microcapsules containing an insulating colored fluid and charged particles dispersed into the colored fluid and a binder are applied onto a substrate by a roll coater or the like.

FIG. 3 is a conceptual view of the resulting electrophoretic display, and FIG. 4 is a conceptual view of the electrophoretic display shown in FIG. 3, viewed from the display section (display face) side. In FIG. 3, reference numeral 31 represents a transparent electrode, reference numeral 32 represents a charged particle, reference numeral 33 represents a colored fluid, reference numeral 41 represents a microcapsule, reference numeral 34 represents a binder, and reference numeral 35 represents a substrate. Also, in this electrophoretic display, the viewer sees the color of the charged particles 32 or the color of the colored fluid 33 from the display section side depending on the polarity from the power source. In this electrophoretic display, the shape of the electrode can also be appropriately changed to perform desired displaying.

Traditional electrophoretic displays using microcapsules, however, have problems such as poor coloring and low contrast because the binder is present between the microcapsules and the substrate to reduce the area in which the substrate at the display face side constituting a substantial display section constituting the display face is in contact with the microcapsules. The binder is also present in the adjacent microcapsules to form portions not contributing to the displaying in the display region, resulting in reduced contrast.

SUMMARY OF THE INVENTION

The present invention for solving the above problems is intended to provide an electrophoretic display using microcapsules and having high contrast, a method for making the electrophoretic display, and an electronic apparatus using the electrophoretic display.

The present invention is characterized in that an electrophoretic display comprising a plurality of microcapsules disposed between a pair of substrates, wherein each microcapsule comprises a capsule body containing an insulating colored fluid and charged particles dispersed in the colored fluid, and the microcapsules are contacted with at least the substrate arranged at a display face side of the pair of substrates.

In general, microcapsules have a substantially spherical shape; hence, the substrate is in face-to-point contact with the microcapsules in traditional electrophoretic displays. Thus, the area of the substrate in contact with the microcapsules is small.

In contrast, in the present invention, microcapsules are contacted with the substrate arranged at the display face side. That is, each microcapsule has a flat surface at least at the display face side so that the substrate at the display face side is in face-to-face contact with the microcapsules. As a result, the proportion of the contact area of the substrate with the microcapsules increases compared with the traditional electrophoretic display, preventing uneven displaying and achieving increased contrast and high-quality displaying.

In the electrophoretic display, mutually adjoining microcapsules are preferably contacted with each other.

Such an electrophoretic display has significantly reduced portions, in plan view, not including microcapsules and thus not contributing to displaying in plan view in the display region, and has a further increased contact area of the substrate with the microcapsules, resulting in higher-quality displaying.

The above electrophoretic display achieves high-quality displaying with high contrast and without uneven display ing; thus, a pair of substrates may be provided such as an active element (TFT element) substrate provided with a plurality of pixel electrodes which are isolated every display pattern or every dot and a switching element connected to each pixel electrode and a counter substrate provided with a common electrode which is commonly used in the entire display region.

Such an electrophoretic display can display any fine shape.

In order to solve the above problems, in a method, according to the present invention, for making an electrophoretic display including a plurality of microcapsules disposed between a pair of substrates, the method comprises disposing a spacer between the pair of substrates to bond the pair of substrates, the spacer having a diameter which is smaller than the diameter of the microcapsules, and fixing the pair of substrates while pressing the substrate so that the microcapsules are contacted with the pair of substrates.

When the pair of substrates is pressed to be fixed in the method for making the electrophoretic display, the microcapsules are crushed and deformed by the pair of substrates by a dimension corresponding to the difference in diameter between the microcapsules and the spacers. As a result, the microcapsules are contacted with the pair of substrates, and the proportion of the area of the substrate in contact with the microcapsules increases compared with traditional electrophoretic displays, thus, preventing uneven displaying and achieving increased contrast and high-quality displaying.

In order to solve the above problems, in a method for making an electrophoretic display including a plurality of microcapsules disposed between a pair of substrates, the method according to the present invention may comprises applying a microcapsule dispersion comprising a binder and microcapsules dispersed in the binder on the substrate lying at the display face side of the pair of substrates and drying the substrate, and bonding the pair of substrates.

In this method for making the electrophoretic display, the microcapsule dispersion is applied on the substrate lying at the display face side and the substrate is dried. As the binder content decreases, microcapsules not in contact with the substrate among the microcapsules in the microcapsule dispersion precipitate and come into contact with the substrate. As the drying proceeds, the distance between the microcapsules gradually decreases in the microcapsule dispersion and the adjacent microcapsules come into contact with each other. When the substrate is further dried, the microcapsules are deformed, so that the microcapsules are in face-to-face contact with the substrate and the adjacent microcapsules are also in face-to-face contact with each other.

Since the microcapsules are contacted with the substrate lying at the display face side in the electrophoretic display obtained by the above method for making the electrophoretic display, the proportion of the contact area of the substrate with the microcapsules increases compared with traditional electrophoretic display, preventing uneven displaying and achieving increased contrast and high-quality displaying.

Also the adjacent microcapsules are contacted with each other in the electrophoretic display made by the method for making the electrophoretic display; hence, the electrophoretic display has significantly reduced portions, in plan view, not including microcapsules and thus not contributing to displaying in the display region, and has a further increased contact area of the substrate with the microcapsules, resulting in higher-quality displaying.

In the method for making the electrophoretic display, preferably, the binder comprises an emulsion adhesive and water, and the microcapsule dispersion is compounded so that the microcapsule dispersion contains 50% or less by weight of the microcapsules and the emulsion adhesive after drying contains 10% by volume or less of the microcapsules. Moreover, the microcapsule dispersion is preferably applied to a thickness which is one time to three times the diameter of the microcapsules.

In this method for making the electrophoretic display, a large number of microcapsules are supplied on the substrate lying at the display face side. Thus, the electrophoretic display has significantly reduced portions, in plan view, not including microcapsules and thus not contributing to displaying in plan view in the display region, and the microcapsule dispersion can be uniformly applied. Accordingly, the electrophoretic display can be easily obtained in which the microcapsules are contacted with the substrate lying at the display face side and the adjacent microcapsules are contacted with each other.

For example, if the microcapsule content exceeds 50 percent by weight of the microcapsule dispersion, the microcapsule dispersion cannot be uniformly applied.

If the emulsion adhesive after drying exceeds 10 percent by volume of the microcapsules, the rate of the volume of the microcapsules to the volume of the emulsion adhesive after the drying of the microcapsule dispersion undesirably increases. In such a case, the area of the substrate in contact with the microcapsules is not so large and the area, in plan view, not including microcapsules and thus not contributing to displaying in the display region undesirably increases.

When the microcapsule dispersion is applied to a thickness which is less than one time or more than three times the diameter of the microcapsules, the microcapsule dispersion cannot be uniformly applied. When the microcapsule dispersion is applied to a thickness less than one time the diameter of the microcapsules, a sufficient number of microcapsules may not be supplied on the substrate lying at the display face side.

More preferably, the microcapsule dispersion is applied to a thickness which is about two times the diameter of the microcapsules.

For solving the above problems, an electronic apparatus according to the present invention uses the above electrophoretic display.

Since such an electronic apparatus uses the above electrophoretic display, the electronic apparatus has a display section which achieves high-quality displaying.

BRIEF DESCRIPTION OF THE DRAWINGS

FIG. 16 is a cross-sectional view of an electrophoretic device that includes microcapsules that include two types of charged particles.

DETAILED DESCRIPTION OF THE PREFERRED EMBODIMENTS

The embodiments of the present invention will now be described with reference to the drawings.

Electrophoretic Display

Figure 1:
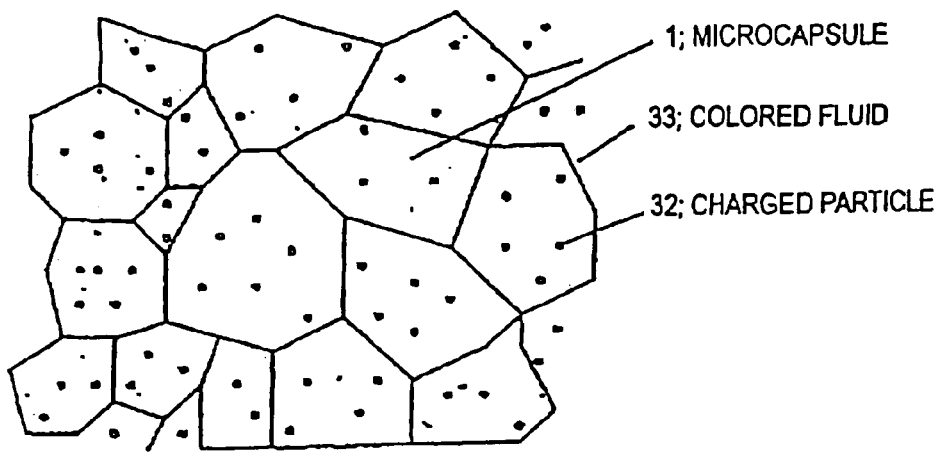
FIG. 1 is a conceptual view, viewed from a display face side, of an electrophoretic display of the present invention.
Figure 2:
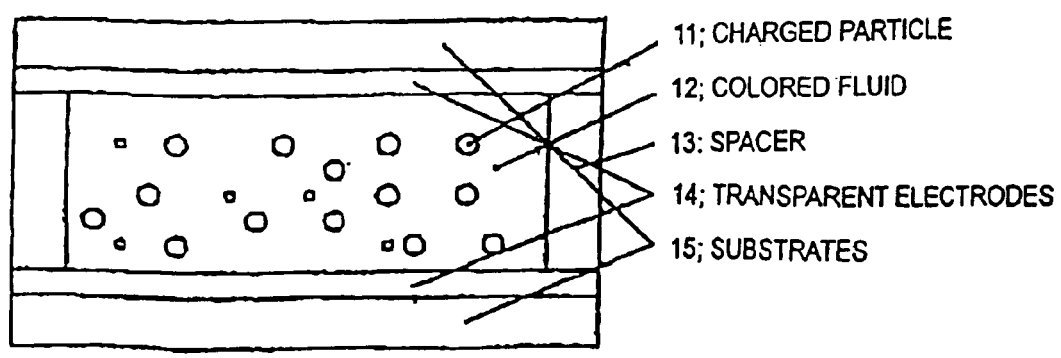
FIG. 2 is a conceptual view illustrating a principle of an electrophoretic display.
Figure 3:
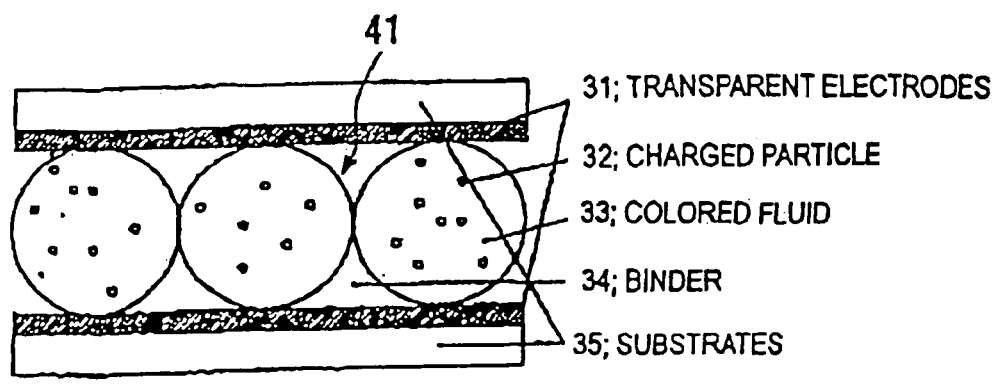
FIG. 3 is a conceptual view of a side face of an electrophoretic display using microcapsules.
Figure 4:
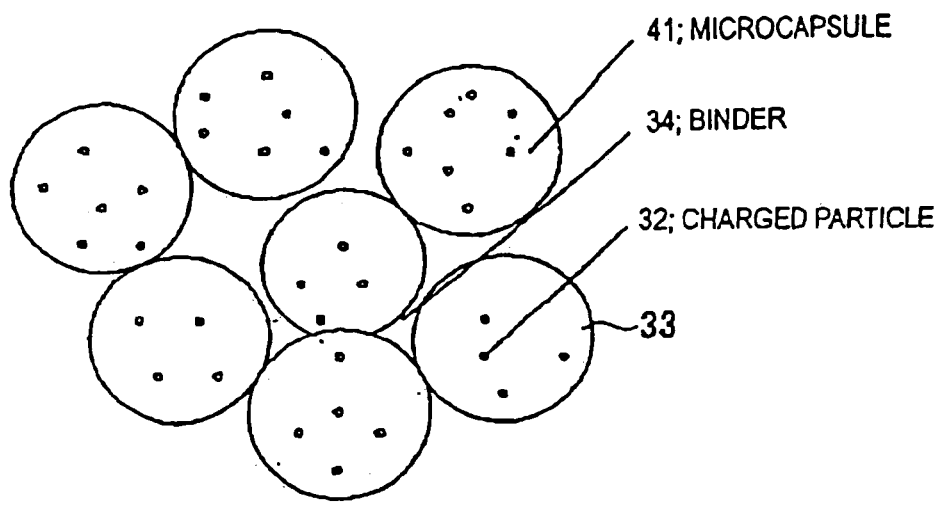
FIG. 4 is a conceptual view, viewed from a display face side, of the electrophoretic display shown in FIG. 3.
Figure 14:
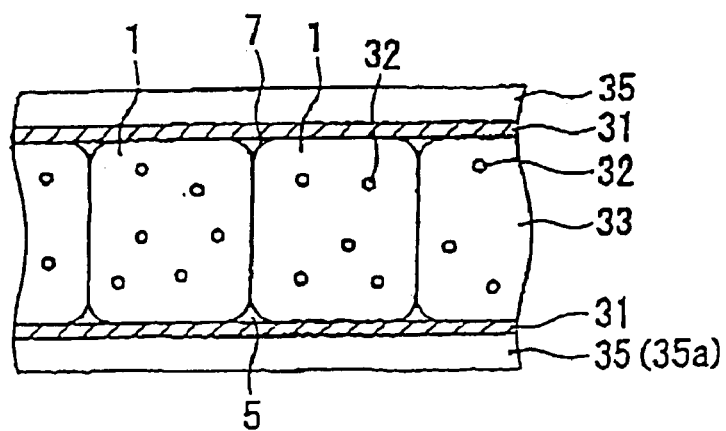
FIG. 14 is an outline cross-sectional view of a part of an example of an electrophoretic display of the present invention.

FIG. 14 is an outline cross-sectional view of a part of an exemplary electrophoretic display according to the present invention, and FIG. 1 is a conceptual view, viewed from the display face side, of the electrophoretic display shown in FIG. 14. The electrophoretic display according to this embodiment is prepared by a method according to the present invention for making an electrophoretic display.

As shown in FIG. 14, this electrophoretic display includes a binder 5 and a plurality of microcapsules 1 dispersed in the binder 5, these being disposed between a pair of substrates 35 and 35, namely, a lower substrate 35a and an upper substrate 35b.

Each microcapsule 1 comprises a capsule body 7 containing an insulating colored fluid 33 and discharged particles 32 dispersed in the colored fluid 33. The colored fluid 33 comprises a solvent and a dye dissolved in the solvent.

The lower substrate 35a and the upper substrate 35b are provided with transparent electrodes 31 and 31, respectively. In this electrophoretic display, the lower substrate 35a lies at the display face side.

In the electrophoretic display of this embodiment, the microcapsules 1 are contacted with the lower substrate 35a and the upper substrate 35b, as shown in FIG. 14. Furthermore, the adjacent microcapsules 1 and 1 are contacted with each other, as shown in FIGS. 1 and 14.

Examples of charged particles 32 used are zinc oxide, barium sulfate, titanium oxide, chromium oxide, calcium carbonate, gypsum, white lead, manganese violet, carbon black, iron black, Prussian blue, ultramarine blue, phthalocyanine blue, chromium yellow, cadmium yellow, lithopone, molybdate orange, fast yellow, benzimidazoline yellow, flavan yellow, naphthol yellow, benzimidazolone orange, perynone orange, iron oxide red, cadmium red, madder lake, naphthol red, dioxane violet, phthalocyanine blue, alkali blue, cerulean blue, emerald green, phthalocyanine green, pigment green, cobalt green, and aniline black.

An insulating solvent is used as the solvent constituting the colored fluid 33. For example, a mixed solvent of ethylene tetrachloride and isoparaffin is used.

An example of dyes dissolved in the solvent is an anthraquinone dye.

The capsule body 7 is formed of arabian gum or gelatin. In order to deform the capsule body 7 without damage, the capsule body 7 must be flexible and have some extent of strength. Such conditions can be achieved by, for example, the amount of formalin used for the cross-linking of gelatin in the preparation of the microcapsules 1. When the amount of formalin used in the cross-linking of gelatin is small, the microcapsules 1 do not have sufficient strength. When the amount is excessive, the microcapsules 1 do not deform due to high hardness. It is preferable that the ratio $W_1/W_2$ of the weight $W_1$ of the gelatin to the weight $W_2$ of aqueous 37% formalin solution be in the range of 0.5 to 20.

The binder 5 is prepared by drying and hardening a binder solution containing an emulsion adhesive and water.

In this electrophoretic display, displaying is performed by switching the polarity of a voltage applied from the transparent electrode 31 through a power source so that the color of the charged particles 32 or of the colored fluid 33 is displayed at the display face side. Furthermore, the electrophoretic display can perform desired displaying by appropriately changing the shape of the transparent electrode 31.

Because the microcapsules 1 are contacted with the lower substrate 35a and the upper substrate 35b, this electrophoretic display has a large contact area between the substrate and the microcapsules, preventing uneven displaying and achieving increased contrast and high-quality displaying.

Because adjacent microcapsules 1 and 1 are contacted with each other in this embodiment, the electronic apparatus has a significantly reduced area not including the microcapsules 1 in plan view and not contributing to displaying and has a significantly large contact area between the substrate and the microcapsules, resulting in significantly high-quality displaying.

Another embodiment of the electrophoretic display described above incorporates the use of microcapsules 1 that include at least one first charged particle 36 and at least one second charged particle 37 dispersed in a fluid medium 38 (FIG. 16). More specifically, the first charged particles 36 are positively charged white particles 36 and the second charged particles 37 are negatively charged black particles 37 suspended in a clear or transparent fluid 38. In operation of such an electrophoretic display, when a negative electric field is applied between the electrodes 31, the positively charged white particles 36 are attracted to the display portion of the microcapsules 1 (in the direction of the negative electric field) where the particles 36 become visible to a viewer. This makes the surface of the microcapsule 1 appear white at that spot. Concurrently, the negatively charged particles 37 are repelled by the negative electric field being applied and, therefore, the negatively charged black particles 37 migrate towards the non-display portion of the microcapsules 1 (in the opposite direction of the negative electric field) where they become hidden from the view of the viewer.

In a reverse process, that is when a positive electric field is applied between the electrodes 31, the negatively charged black particles 37 are attracted to the display portion of the microcapsules 1 (in the direction of the positive electric field) where the particles 37 become visible to the viewer. Such an action makes the surface appear black at that spot. At the same time, the positively charged particles 36 are repelled by the positive electric field being applied and, therefore, the positively charged white particles 36 migrate towards the non-display portion of the microcapsules 1 (in the opposite direction of the positive electric field) where they become hidden from the view of the viewer.

Similar to the first embodiment, since the microcapsules 1 are in contact with the lower substrate 35a and the upper substrate 35b, the electrophoretic display has a large contact area between the substrate and the microcapsules which prevents an uneven display and achieves an increased contrast and high-quality display. Further, because the adjacent microcapsules 1 and 1 may be deformed to be in contact with each other like the first embodiment, the electronic apparatus has a significantly large contact area between the substrates and the microcapsules, which results in significantly high-quality display. This is evident when referring to FIG. 16, where it can be seen that the microcapsules may become deformed such that portions of the microcapsules 1 overlap portions of adjacent electrodes 31 (electrodes 31 on the substrate 35a, for example). Since each microcapsule includes both positively and negatively charged particles 36 and 37, respectively, if a microcapsule 1 overlaps adjacent electrodes that are applying differing electric fields, a single microcapsule 1 may exhibit both a light and dark display simultaneously due to both the positively and negatively charged particles 36 and 37 being attracted to the differing electric fields applied at adjacent electrodes 31. In this manner, an improved display contrast can be achieved.

It should be understood and appreciated that although the use of white and black particles. 36 and 37 are described above, the present invention should not be limited thereto. More particularly, any desirable choice of colors for the particles may be utilized and is contemplated. Preferably, however, the charged particles 36 and 37 are comprised of zinc oxide, barium sulfate, titanium oxide, chromium oxide, calcium carbonate, gypsum, white lead, manganese violet, carbon black, iron black, Prussian blue, ultramarine blue, phthalocyanine blue, chromium yellow, cadmium yellow, lithopone, molybdate orange, fast yellow, benzimidazoline yellow, flavan yellow, naphthol yellow, benzimidazolone orange, perynone orange, iron oxide red, cadmium red, madder lake, naphthol red, dioxane violet, phthalocyanine blue, alkali blue, cerulean blue, emerald green, phthalocyanine green, pigment green, cobalt green, and aniline black. Moreover, although a clear fluid 38 is used in the above embodiment, the present invention anticipates that any other color fluid may be used.

Method for Making Electrophoretic Display

An exemplary method for making the electrophoretic display will now be described.

A dye is dissolved into a solvent to prepare a colored fluid 33. Discharged particles 32 which are preliminarily treated with surfactant or the like are dispersed into the colored fluid 33. The colored fluid 33 and the discharged particles 32 are packed into a capsule body 7 by a coacervation process to form substantially spherical microcapsules having a diameter of 30 to 200 μm.

The resulting microcapsules are dispersed into the binder solution to prepare a microcapsule dispersion.

The binder solution used contains an emulsion adhesive and water. Examples of desirable emulsion adhesives constituting the binder solution are silicon resins, acrylic resins, and polyurethane resins.

The microcapsule dispersion used is preferably compounded so that the microcapsules are 50 percent by weight or less of the microcapsule dispersion and the emulsion adhesive after drying is 10 percent by volume or less of the microcapsules.

When the microcapsules 1 exceed 50 percent by weight of the microcapsule dispersion, the microcapsule dispersion cannot be uniformly applied. When the emulsion adhesive after drying exceeds 10 percent by volume of the microcapsules 1, the ratio of the volume of the emulsion adhesive to the volume of the microcapsules 1 undesirably increases after drying the microcapsule dispersion. In such a case, the area of the substrate in contact with the microcapsules is not so large and the area not including microcapsules 1 in plan view and not contributing to displaying in the display region undesirably increases.

After the microcapsule dispersion is applied to the lower substrate 35a, the substrate is dried.

Figure 15:
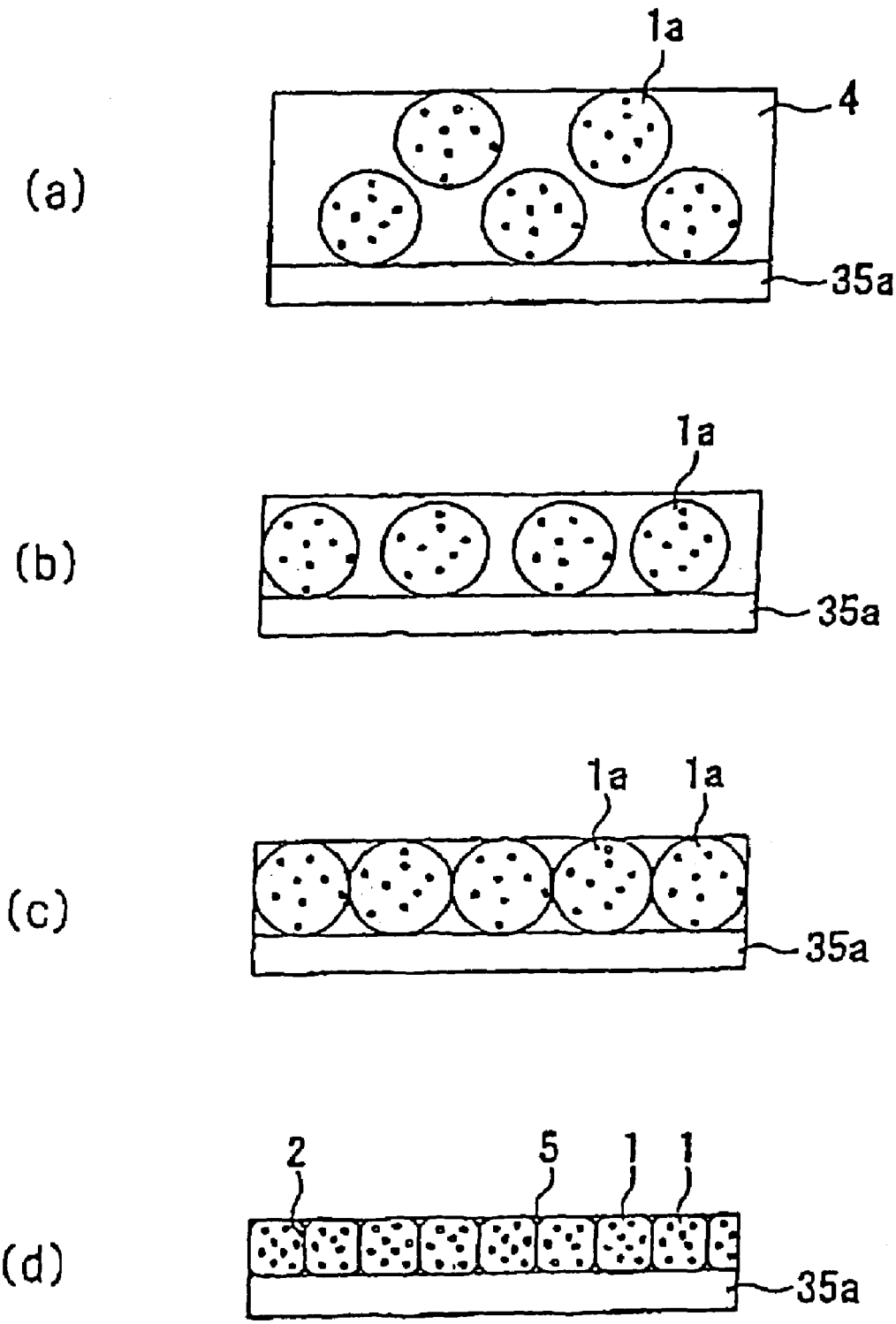
FIG. 15 includes drawings of parts of a method for making an electrophoretic display of the present invention for illustrating the applying a microcapsule dispersion and drying.

Referring now to FIG. 15, applying the microcapsule dispersion and drying the substrate according to this embodiment will be described in detail. In FIG. 15, the transparent electrode provided on the lower substrate is not depicted to facilitate the understanding of the drawing.

In FIG. 15, reference numeral 35a represents a lower substrate, reference numeral 1a represents a microcapsule, and reference numeral 4 represents a binder solution.

As shown in FIG. 15(a), the microcapsule dispersion is applied by, for example, a process using a coater. The microcapsule dispersion is applied to a thickness which is preferably one time to three times and more preferably about two times the diameter of the microcapsules 1a. If the microcapsule dispersion is applied to, for example, a thickness exceeding three times the diameter of the microcapsules or a thickness of less than one time the diameter of the microcapsules, uniform application is not achieved.

The lower substrate 35a with the applied microcapsule dispersion is dried at room temperature for 1 hour then at 50° C. to 95° C. for at least 5 minutes.

When starting drying the microcapsule dispersion, the volume of the binder solution 4 constituting the microcapsule dispersion decreases. As the volume of the binder solution 4 decreases, as shown in FIG. 15(b), microcapsules 1a not in contact with the lower substrate 35a among the microcapsules 1a contained in the microcapsule dispersion precipitate and are in contact with the lower substrate 35a.

As the drying further proceeds, the distance between the microcapsules 1a and 1a in the microcapsule dispersion gradually decreases, and as shown in FIG. 15(c), adjacent microcapsules 1a and 1a come into contact with each other so that the microcapsules 1a are close-packed on the lower substrate 35a.

As the drying further proceeds, the microcapsules 1a deform, as shown in FIG. 15(d), so that each microcapsules 1 has a flat face in contact with the lower substrate 35a, a flat face in contact with the upper substrate 35b, and flat faces in contact with the adjoining microcapsules. Thus, the microcapsules 1 come into face-to-face contact with the lower substrate 35a and the adjoining microcapsules 1 and 1 also come into face-to-face contact with each other. Furthermore, the binder solution 4 changes to the binder 5 by reduction in volume and the drying of the microcapsule dispersion is completed.

Next, the lower substrate 35a and the upper substrate 35b are bonded using, for example, a laminator to form the electrophoretic display shown in FIG. 14.

In such a method for making the electrophoretic display, the microcapsules 1 are contacted with the lower substrate 35a and the upper substrate 35b; hence, the microcapsules are contacted with the pair of substrates, and the proportion of the area of the substrate in contact with the microcapsules increases compared with traditional electrophoretic displays, thus, preventing uneven displaying and achieving increased contrast.

Further, according to a method for making the above-mentioned electrophoretic display, mutually adjoining microcapsules, 1,1 are contacted with each other. Therefore, the resulting electrophoretic display has significantly reduced portions, in plan view, not including microcapsules 1 and thus not contributing to displaying in plan view in the display region, and has a further increased contact area of the substrate with the microcapsules 1, resulting in extremely higher-quality displaying.

Furthermore, the microcapsule dispersion is compounded so that the microcapsule dispersion contains 50% or less by weight of the microcapsules 1a and the emulsion adhesive after drying contains 10% by volume or less of the microcapsules 1a. Moreover, the microcapsule dispersion is preferably applied to a thickness which is one time to three times the diameter of the microcapsules 1a. As a result, a large number of microcapsules 1a are supplied on the lower substrate 35a, and the microcapsules 1a readily deform during drying the microcapsule dispersion. Thus, the resulting electrophoretic display can be easily obtained in which the microcapsules 1 are contacted with the lower substrate 35a and the upper substrate 35b and the adjoining microcapsules 1 are in areas contact with each other.

It should be understood that although the above method has been described using microcapsules 1 comprising the discharged particles 32, microcapsules 1 comprising the first charged particles 36 and second charged particles 37 may also be employed and is contemplated.

Method for Making Electrophoretic Display

An electrophoretic display made by the method of this embodiment for making an electrophoretic display is different from the electrophoretic display of the above first embodiment only in that a material constituting the binder and the method. Thus, only different portions of the method will be described in detail without detailed description of the electrophoretic display.

In the method for making the electrophoretic display according to this embodiment, substantially spherical microcapsules 1a are formed by a similar method to the method for making the electrophoretic display described in the first embodiment.

The resulting microcapsules 1a are dispersed into a binder 5 to prepare a microcapsule dispersion.

Resins generally used as the binder 5 can be used for the binder 5, and silicon resins and urethane resins are particularly preferred.

The microcapsule dispersion used in this embodiment may be, for example, a 60:5:60 (by weight ratio) mixture of the microcapsules 1a and the binder 5 containing a silicon or urethane resin and water.

Next, the microcapsule dispersion is applied onto the lower substrate 35a by, for example, a process using a coater. Spacers which are thinner than the diameter of the microcapsules 1a are then arranged at positions not provided with the microcapsules 1a. The lower substrate 35a and the upper substrate 35b are bonded with the spacers therebetween and fixed by lamination under pressure.

The substantially spherical microcapsules 1a are crushed and deformed by the lower substrate 35a and the upper substrate 35b by a dimension corresponding to the difference in diameter between the microcapsules 1a and the spacers. As a result, each microcapsules 1 has a flat face in contact with the lower substrate 35a, a flat face in contact with the upper substrate 35b, and flat faces in contact with the adjoining microcapsules.

The electrophoretic display shown in FIG. 14 is thereby formed.

In the method for making the electrophoretic display, the substantially spherical microcapsules 1a are crushed and deformed by the lower substrate 35a and the upper substrate 35b by a dimension corresponding to the difference in diameter between the microcapsules 1a and the spacers, when the lower substrate 35a and the upper substrate 35b are fixed. Thus, the microcapsules 1 are in face-to-face contact with the lower substrate 35a and the upper substrate 35b, and the area of the substrate in contact with the microcapsules increases. The resulting electrophoretic display exhibits uniform displaying and high contrast.

In the above method for making the electrophoretic display, substantially spherical microcapsules are formed by a coacervation process. The microcapsules may be formed by any method, for example, an interfacial condensation process or a solvent evaporation process, other than the coacervation process.

As described in the above method for making the electrophoretic display, the microcapsule dispersion is preferably applied by a method using a coater. However, any general method may be used without limitation.

In the first embodiment, the microcapsule dispersion may be prepared as follows.

With reference to FIG. 15(c), the spatial volume (V1) of the substantially spherical microcapsules 1a in a closest packing state on the entire surface of the lower substrate 35a and the other spatial volume (V2) are calculated to determine R=V1/V2. The microcapsules 1a and the emulsion adhesive are mixed so that the ratio becomes larger than R. The mixture of the microcapsules 1a and the emulsion adhesive is appropriately diluted with water or a solvent to prepare a microcapsule dispersion. Also in this case, advantages similar to those described in the first embodiment are achieved.

As shown in the above second embodiment, spacers may be arranged at portions not including the microcapsules 1a to bond the lower substrate 35a and the upper substrate 35b. Alternatively, a desired electrophoretic display may be fabricated by preliminarily dispersing spherical spacers having a diameter which is smaller than the diameter of the microcapsules 1a into a microcapsule dispersion, applying the microcapsule dispersion containing dispersed spacers as in the second embodiment, bonding the lower substrate 35a and the upper substrate 35b as in the second embodiment, and laminating them under pressure.

Electronic Apparatus

In this embodiment, examples of electronic apparatuses provided with the electrophoretic displays according to the present invention will be described.

The electronic apparatuses according to the present invention can be prepared by mounting the electrophoretic displays according to the present invention into display sections of the electronic apparatuses.

Since the resulting electrophoretic displays ensure semi permanent displaying after writing is performed, the displays are significantly effective in displaying for a prolonged time.

Figure 8:
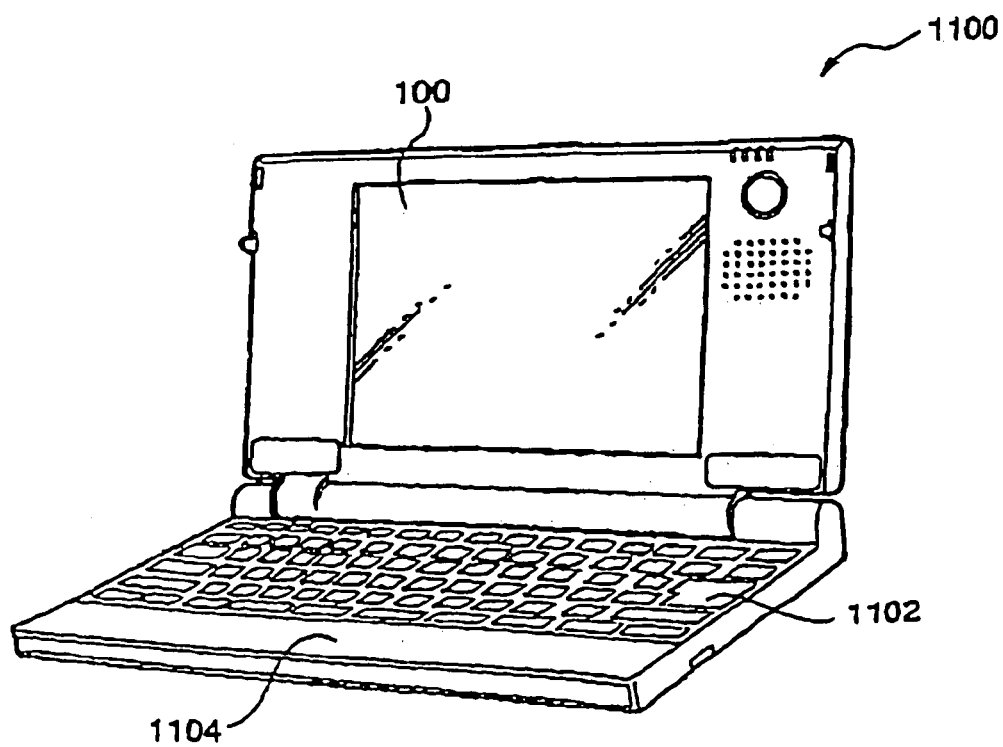
FIG. 8 is an isometric view illustrating the configuration of a personal computer, as an example of electronic apparatuses of the present invention.

An example of the electrophoretic display according to the above embodiments applied to a mobile personal computer will now be described. FIG. 8 is an isometric view illustrating the configuration of this personal computer. In FIG. 8, the personal computer 1100 comprises a main frame 1104 with a keyboard 1102 and a display unit provided with the above-mentioned electrophoretic display 100.

Figure 9:
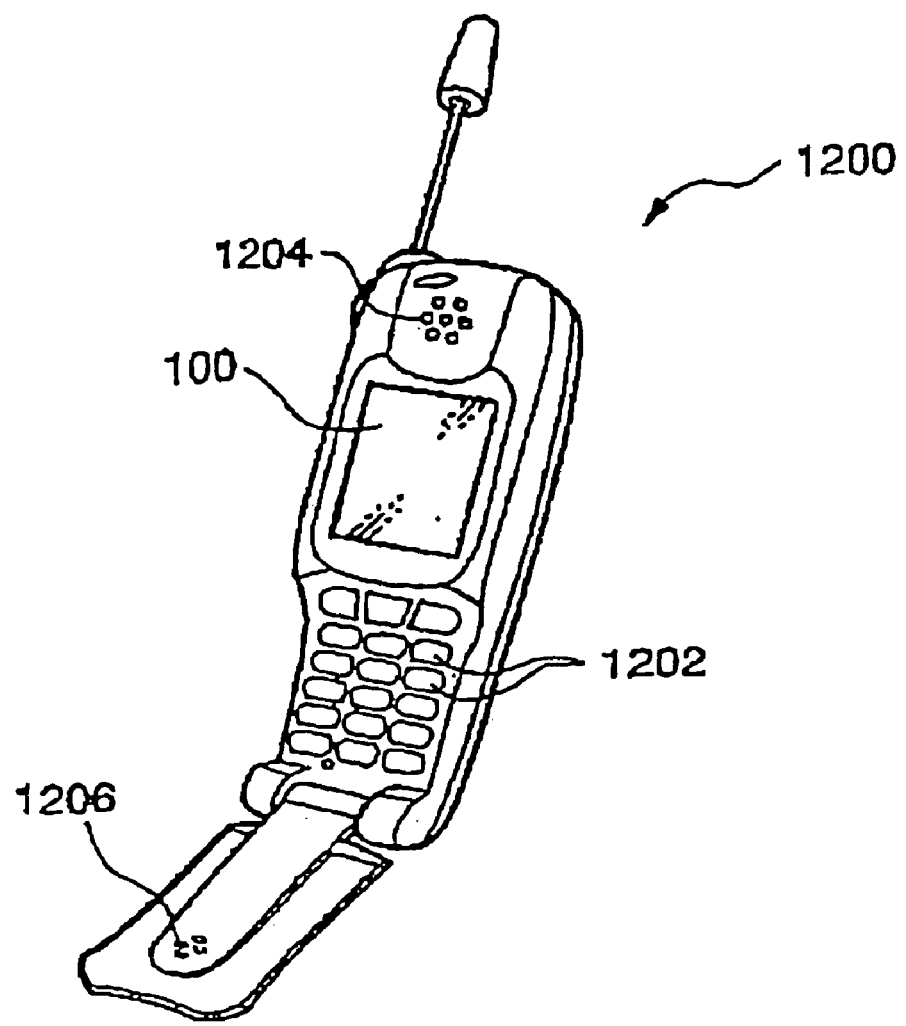
FIG. 9 is an isometric view illustrating the configuration of a mobile phone, as an example of the electronic apparatuses.

An example of the electrophoretic display according to the above embodiment applied to a mobile phone will now be described. FIG. 9 is an isometric view illustrating the configuration of this mobile phone. In FIG. 9, the mobile phone 1200 comprises a plurality of manual operation buttons 1202, an earpiece 1204, a mouthpiece 1206, and the above-mentioned electrophoretic display 100.

Figure 10:
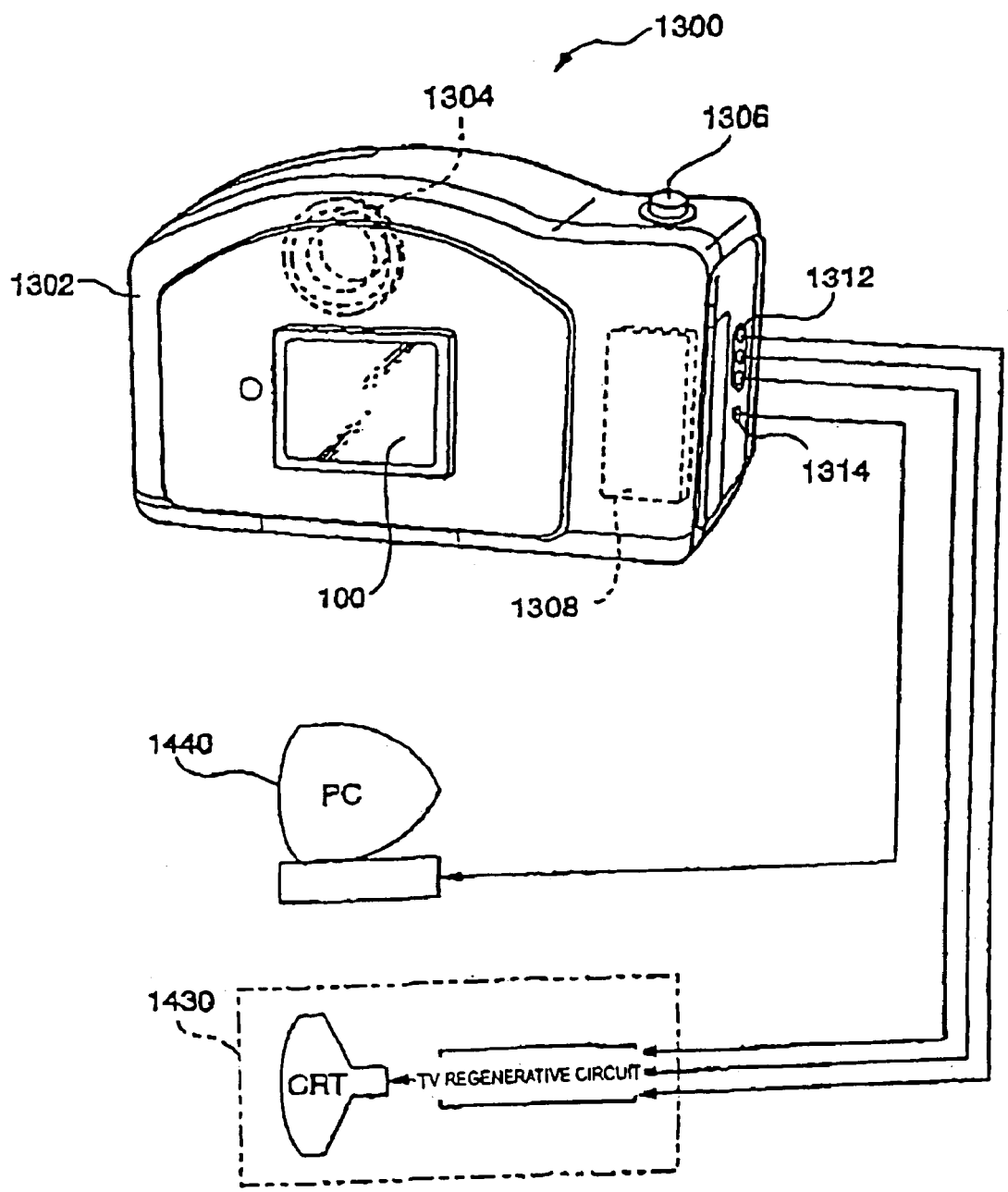
FIG. 10 is an isometric view illustrating the configuration at the rear face of a still digital camera, as an example of the electronic apparatuses.

A digital still camera using the electrophoretic display according to the above embodiment as a finder will now be described. FIG. 10 is an isometric view illustrating the configuration of this digital still camera and includes simplified illustration of the connection to external apparatuses.

A conventional camera exposes a film by an optical image of an object, whereas the digital still camera 1300 generates imaging signals by photoelectric conversion of the optical image of the object with an imager such as a charge-coupled device (CCD). The digital still camera 1300 is provided with the above electrophoretic display 100 at the rear face of a case 1302 to perform displaying based on the imaging signals from the CCD. Thus, the electrophoretic display 100 functions as a finder displaying the object. The case 1302 is provided with a photo-detecting unit 1304 including optical lenses and the CCD at the viewer side (rear face in FIG. 10).

When an operator releases a shutter button 1306 after confirming an object displayed in the electrophoretic display 100, the imaging signals from the CCD at this time are transferred and stored in memory on a circuit board 1308. This digital still camera 1300 is provided with a video signal output terminal 1312 and an input/output terminal 1314 for data communication at a side of the case 1302. As shown in FIG. 10, the former video signal output terminal 1312 is connected to a television monitor 1430 and the latter input/output terminal 1314 for data communication is connected to a personal computer 1430, if necessary. The imaging signals stored in the memory on the circuit board 1308 are output to a television monitor 1430 and a personal computer 1440 by predetermined operations.

Figure 11:
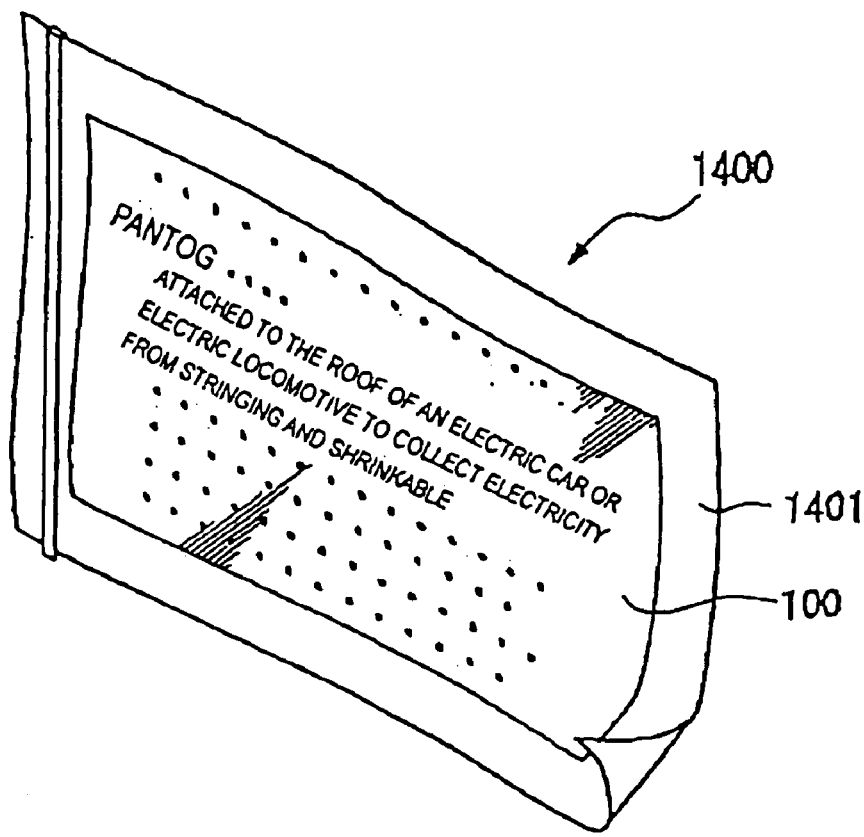
FIG. 11 is an isometric view illustrating the configuration of an electronic sheet, as an example of the electronic apparatuses.

An example of the electrophoretic display according to the above embodiment applied to a display for an electronic sheet will now be described. FIG. 11 is an isometric view illustrating the configuration of this electronic sheet. In FIG. 11, the electronic sheet 1400 comprises a main body 1401 of a rewritable sheet having volume and flexibility like paper and a display unit provided with the above-mentioned electrophoretic display 100.

Figure 12:
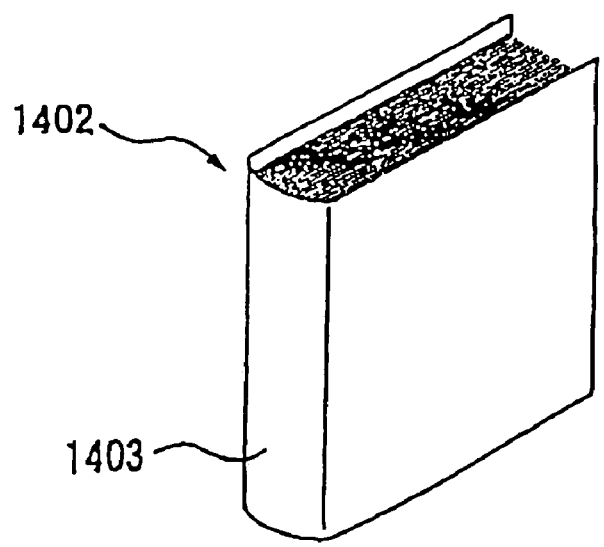
FIG. 12 is an isometric view illustrating the configuration of an electronic notebook, as an example of the electronic apparatuses.

FIG. 12 is an isometric view illustrating the configuration of an electronic notebook. In FIG. 12, the electronic notebook 1402 comprises a plurality of the electronic sheets 1400 shown in FIG. 11 which are sandwiched by a cover 1403. The electronic notebook 1402 may be provided with means for inputting data to be displayed in the cover 1403 so that the displayed contents on the bundled electronic sheets 1400 can be changed.

Figure 13:
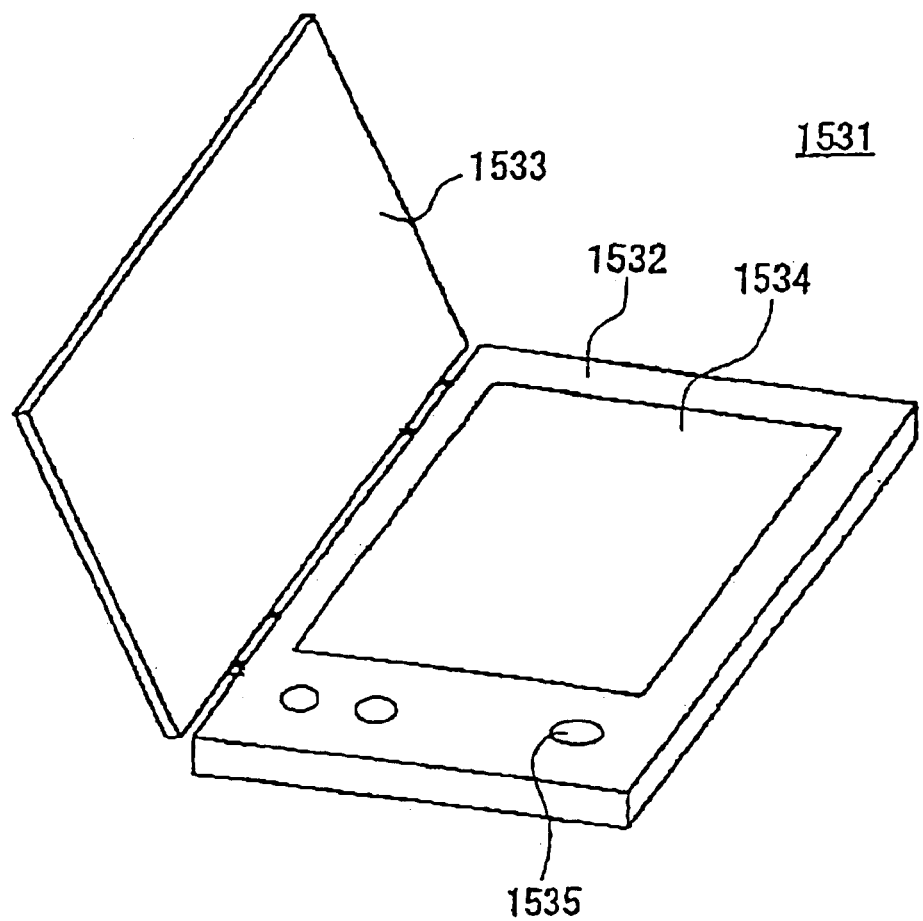
FIG. 13 is an isometric view illustrating the configuration of an electronic book, as an example of the electronic apparatuses of the present invention.

An example of the electrophoretic display according to the above embodiment applied to an electronic book will now be described. FIG. 13 is an isometric view illustrating the configuration of this electronic book.

In FIG. 13, reference numeral 1531 represents the electronic book. The electronic book 1531 has a book-shaped frame 1532 and a cover 1533 capable of opening and closing the frame 1532. The frame 1532 is provided with a display 1534 including the above-mentioned electrophoretic display in such a state that the display screen is exposed and further with an operation unit 1535.

Examples of electronic apparatuses, other than the personal computer shown in FIG. 8, the mobile phone shown in FIG. 9, the digital still camera shown in FIG. 10, the electronic sheet shown in FIG. 11, the electronic notebook shown in FIG. 12, and the electronic book shown in FIG. 13, are liquid crystal television sets, view finder type and monitoring type videotape recorders, car navigation systems, pagers, electronic data books, electronic calculators, word processors, workstations, videophones, POS terminals, apparatuses with touch panels, and the like. Of course, the above-mentioned electrophoretic display can be applicable to displays for these electronic apparatuses.

In addition, the electronic apparatus of the present invention ensures semi permanent displaying after writing is performed; hence, the display is significantly effective in the display for date in clocks and watches, posters, notice boards, and the like which are used for a prolonged time.

The present invention will now be described in detail based on the following EXAMPLES.

EXAMPLE 1

The electrophoretic display shown in FIGS. 1 and 13 was produced as follows:

Titanium dioxide discharged particles 32 of about 0.3 μm were treated with a surfactant and were dispersed into a colored fluid 33 composed of dodecyl benzene colored with an anthraquinone blue dye. The colored fluid 33 containing the dispersed discharged particles 32 was added to an aqueous solution containing arabian gum and gelatin, and the mixture was stirred by an appropriate rotation to prepare substantially spherical microcapsules. The microcapsules 1a was classified into microcapsules 1a of 50 to 60 μm.

The microcapsules 1a and a silicon resin binder 5 were mixed in a ratio by weight of 95:5 to prepare a microcapsule dispersion, and the matching circuit was applied on a glass lower substrate 35a with a transparent electrode 31 using a coater. After the application, spacers with a thickness of 30 μm were arranged around the microcapsules 1a. A glass upper substrate with a transparent electrode 31 was bonded thereto, and these were fixed by curing in a high-temperature oven at 120° C. under a pressure of 2 kg/cm$^2$ to complete the electrophoretic display.

Figure 5:
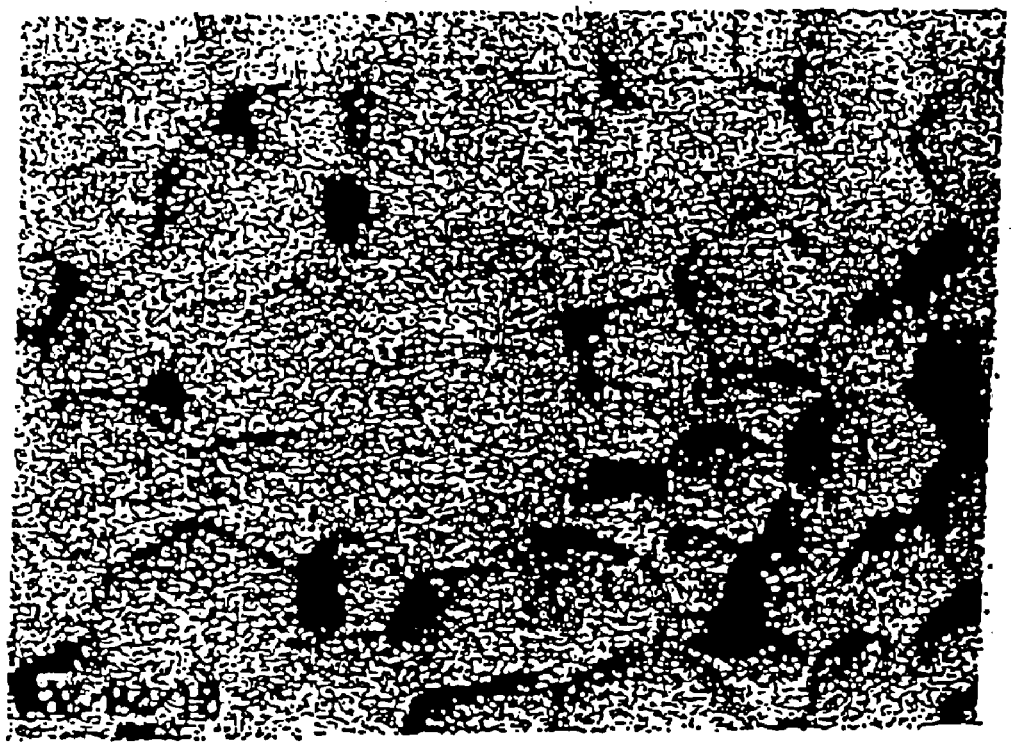
FIG. 5 is a photograph, viewed from a display face side, of an electrophoretic display according to EXAMPLE 1.

A photograph viewed from the display face side of the resulting electrophoretic display is shown in FIG. 5. FIG. 5 shows that microcapsules 1 in contact with the surface of the substrate at the display face side are contacted with the substrate and that adjoining microcapsules 1 and 1 are contacted with each other. This electrophoretic display was driven at 40 volts and the difference in brightness blue displaying and white displaying was 30.

EXAMPLE 2

The electrophoretic display shown in FIGS. 1 and 13 was produced as follows:

Microcapsules 1a prepared as in EXAMPLE 1 and a binder 5 containing a silicon resin and water were mixed in a ratio by weight of 56:4:40 to prepare a microcapsule dispersion, and the microcapsule dispersion was applied on a lower substrate 35a similar to that in EXAMPLE 1 using a coater. After the application, the substrate was dried at 90° C. for 20 minutes, and a glass upper substrate with a transparent electrode 31 was bonded thereto to complete the electrophoretic display.

Figure 7:
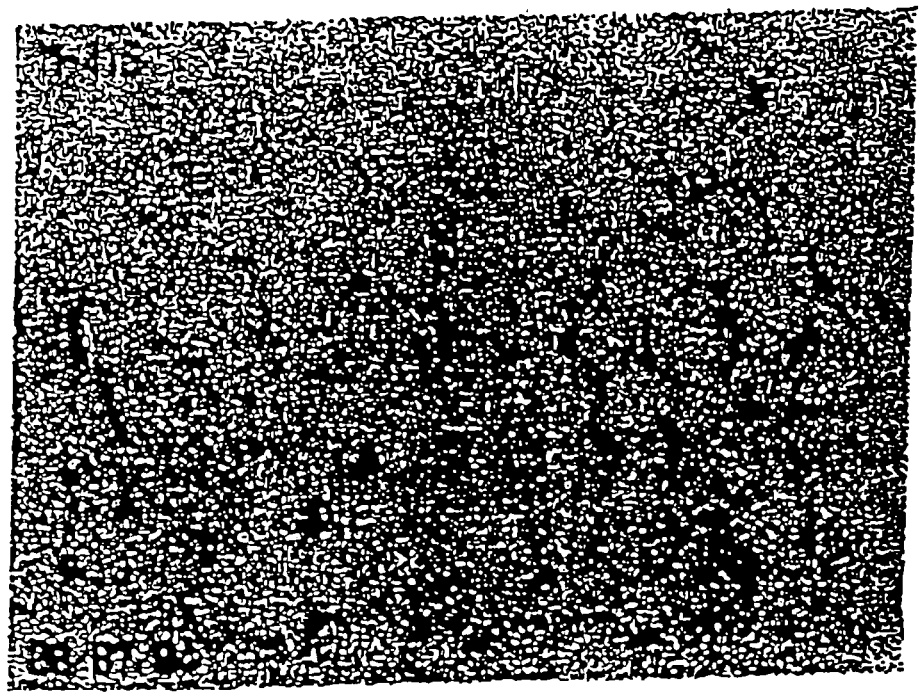
FIG. 7 is a photograph, viewed from a display face side, of an electrophoretic display according to EXAMPLE 2.

A photograph viewed from the display face side of the resulting electrophoretic display is shown in FIG. 7. FIG. 7 shows that microcapsules 1 in contact with the surface of the substrate at the display face side are contacted with the lower substrate 35a, and that adjoining microcapsules 1 and 1 are contacted with each other. This electrophoretic display was driven at 50 volts and the difference in brightness between blue displaying and white displaying was 29.

Conventional Example

A microcapsule dispersion prepared as in EXAMPLE 1 was applied on a lower substrate 35a similar to that in EXAMPLE 1 using a coater. After the application, an upper substrate similar to that in EXAMPLE 1 was bonded thereto and these were fixed by curing by a conventional process without pressure to complete an electrophoretic display.

Figure 6:
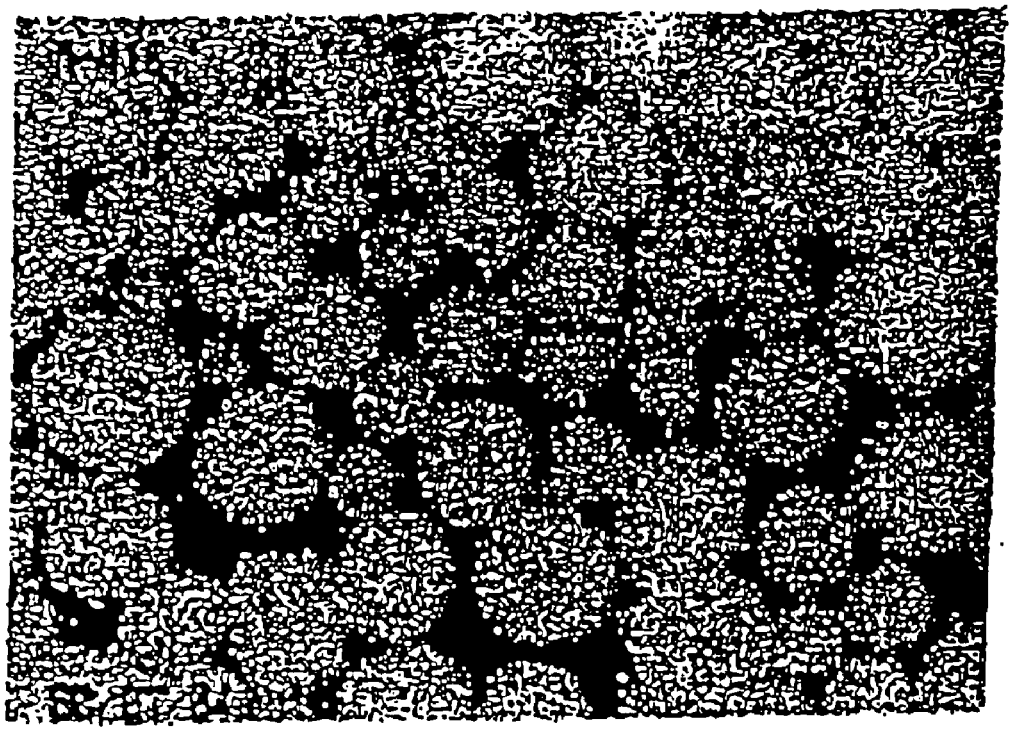
FIG. 6 is a photograph, viewed from a display face side, of a traditional electrophoretic display.

A photograph viewed from the display face side of the resulting electrophoretic display is shown in FIG. 6. FIG. 6 shows that microcapsules are spherical, that many portions not including microcapsules in plan view are present, and that the contact area of the substrate with the microcapsules is small. This electrophoretic display was driven and the difference in brightness between blue displaying and white displaying was 20.

The ratio of the volume of the silicon resin to the volume of the microcapsules after drying was 48:52.

EXAMPLE 3

Using the electrophoretic display prepared in EXAMPLE 2, an electrophoretic display which can display-segments two-digit date was prepared and assembled into a wrist watch with date displaying, and a boosting circuit was assembled to drive the watch.

This display is superior to traditional one including a liquid crystal device in color brightness and appearance. Moreover, the device is about 30% superior to an electrophoretic display prepared by a traditional method in difference in brightness.

EXAMPLE 4

Using the electrophoretic display prepared in EXAMPLE 2, a scoreboard for games was prepared. The scoreboard is an electrophoretic display with a height of 20 cm and a width of 10 cm comprising a panel of 7 segments and 2 digits.

This electrophoretic display was driven by a driving circuit at 50 volts and exhibits display performance which can be distinctly recognized at a place which is several ten meters from the display.

EXAMPLE 5

A electrophoretic display was prepared as in EXAMPLE 2 except that a TFT substrate was used, electrodes being arranged in a matrix, each electrode being connected to the corresponding TFT element to independently drive the TFT element.

The electrophoretic display was driven at 20 volts and displayed any shape.

EXAMPLE 6

The electrophoretic display shown in FIGS. 1 and 13 was produced as follows:

Microcapsules 1*a* prepared as in EXAMPLE 1 and a binder 5 containing a silicon resin and water were mixed in a ratio by weight of 46:8:46 to prepare a microcapsule dispersion, and the microcapsule dispersion was applied on a lower substrate 35*a* similar to that in EXAMPLE 1 into a thickness of 120 µm using a coater. After the application, the substrate was dried at room temperature for one hour and at 90° C. for 20 minutes, and a glass upper substrate with a transparent electrode 31 was bonded thereto to complete the electrophoretic display.

This electrophoretic display was driven at 20 volts and the difference in brightness between blue displaying and white displaying was 29.

The ratio of the volume of the silicon resin to the volume of the microcapsules after drying was 10:100.

Advantages

Portions not concerned with the displaying of a traditional electrophoretic display including microcapsules and two substrates holding the microcapsules are eliminated to achieve uniform displaying with decreased uneven portions. In addition, a large difference in brightness contributing an improved contrast is achieved. As a result, fine driving can be performed as in a TFT driving display.

What is claimed is:

1. An electrophoretic display comprising:
   a plurality of microcapsules, each of which includes a capsule body, a charged particle, and a fluid, encapsulated by the capsule body, the capsule body including an Arabian gum or a gelatin, the plurality of microcapsules contacting to each other;
   a first substrate contacting to a first portion of each of the plurality of microcapsules, the first portion having a planar shape;
   a second substrate contacting to a second portion of the each of the plurality of microcapsules, the second portion having a planar shape; and
   an adhesive disposed between the first and second substrate, the adhesive being 10 percent by volume or less than a sum of volumes of the plurality of microcapsules.

2. An eectrophoretic display comprising:
   a plurality of microcapsules, each of the plurality of microcapsules including charged particles and a fluid, the plurality of microcapsules contacting to each other;
   a first substrate contacting to a first portion of each of the plurality of microcapsules, the first portion having a planar shape; and
   a second substrate contacting to a second portion of the each of the plurality of microcapsules, the second portion having a planar shape; and
   an adhesive disposed between the first and the second substrate, the adhesive being 10 percent by volume or less than a sum of volumes of the plurality of microcapsules.

3. The electrophoretic display according to claim 2, a capsule body of the microcapsule including an Arabian gum or a gelatin.

4. The electrophoretic display according to claim 2, further comprising;
   a spacer disposed between the first and the second substrate.

5. An electronic device including the electrophoretic display according to claim 2.

* * * * *

UNITED STATES PATENT AND TRADEMARK OFFICE
CERTIFICATE OF CORRECTION

PATENT NO. : 7,161,732 B2 Page 1 of 1
APPLICATION NO. : 11/321774
DATED : January 9, 2007
INVENTOR(S) : Sadao Kanbe It is certified that error appears in the above-identified patent and that said Letters Patent is hereby corrected as shown below:

Col. 7, Line 21    "particles. 36" should be --particles 36--

Col. 14, Line 28   "eectrophoretic" should be --electrophoretic--

Col. 14, Line 49   "device" should be --apparatus--

Signed and Sealed this

Fifteenth Day of April, 2008

JON W. DUDAS
*Director of the United States Patent and Trademark Office*